United States Patent
Lin

(10) Patent No.: US 7,167,508 B2
(45) Date of Patent: Jan. 23, 2007

(54) APPARATUS AND METHOD FOR ESTIMATING ANGLE-OF-ARRIVAL

(75) Inventor: Tsui-Tsai Lin, Taoyuan (TW)

(73) Assignee: Benq Corporation, Taoyuan (TW)

( * ) Notice: Subject to any disclaimer, the term of this patent is extended or adjusted under 35 U.S.C. 154(b) by 894 days.

(21) Appl. No.: 10/187,956

(22) Filed: Jul. 3, 2002

(65) Prior Publication Data
US 2003/0012265 A1 Jan. 16, 2003

(30) Foreign Application Priority Data
Jul. 4, 2001 (TW) .................................. 90116412

(51) Int. Cl.
*H04B 1/707* (2006.01)
(52) U.S. Cl. ....................................... 375/148; 375/147
(58) Field of Classification Search ................ 375/147, 375/148, 346, 347, 349; 455/65.1, 272, 273, 455/456.1, 456.5, 561, 562.1; 342/445, 450, 342/457; 370/335, 342, 441
See application file for complete search history.

(56) References Cited

U.S. PATENT DOCUMENTS

| 5,786,791 A | * | 7/1998 | Bruckert | 342/457 |
| 6,347,234 B1 | * | 2/2002 | Scherzer | 455/562.1 |

* cited by examiner

*Primary Examiner*—Betsy L. Deppe
(74) *Attorney, Agent, or Firm*—Rabin & Berdo P.C.

(57) ABSTRACT

An apparatus and method for estimating the angle-of-arrival. The apparatus includes a de-spreading unit, a multipath suppressor, an AOA estimator. The de-spreading unit receives and de-spreads the first and the second spread signals, and outputs the first and the second despread signals. The multipath suppressor receives the first and the second despread signals, suppresses the multipath effects and accordingly outputs the first and the second de-noise signals. The AOA estimator receives the first and the second de-noise signals and outputs the angle-of-arrival accordingly.

8 Claims, 3 Drawing Sheets

APPARATUS AND METHOD FOR ESTIMATING ANGLE-OF-ARRIVAL

This application incorporates by reference of Taiwan application Serial No. 90116412, filed Jul. 4, 2001.

BACKGROUND OF THE INVENTION

1. Field of the Invention

The invention relates in general to the apparatus and method for estimating angle-of-arrival, and more particularly to the apparatus and method for estimating angle-of-arrival with suppressing multipath effects in a spread spectrum communication system.

2. Description of the Related Art

The wireless communication system is popularly used for convenience. For the sake of mobile callers' safety, the wireless communication system is recently required to be capable of determining the positions of mobile stations. With the positions of mobile callers, the emergency responsiveness of the emergency service, such as 911 service, can be improved. A network-based positioning system, for example, uses the given position of a base station (BS) to locate a mobile station (MS). The MS may be a cellular phone or other mobile communication device. The conventional positioning system determines the position of an MS by either the angle-of-arrival (AOA) of the incoming wireless signal or the timing-advance variable thereof.

FIG. 1 is a diagram showing a mobile positioning system by using AOA. In FIG. 1, an MS is positioned at the intersection of the first line of bearing (LOB) L1 and the second LOB L2. The first base station, BS1, and the second base station, BS2, each have an antenna array. A wireless signal 110 is emitted by the MS in all directions and then arrives at the base stations BS1 and BS2. The AOA $\theta_1$ of the BS1 and the AOA $\theta_2$ of the BS2 are obtained by performing an array signal processing on the received wireless signal. LOB L1 and LOB L2 are generated according to the AOAs $\theta_1$ and $\theta_2$, and then the MS is located at the intersection of LOB L1 and LOB L2. From the above description, at least two BSs are required to determine the position of the MS. For more accurate position of the MS, more BSs are required to estimate the AOA of the MS. However, the complexity of the base stations increases. In the existing wireless communication system, each base station using space diversity technique has two or three antennas only, while the above-mentioned base station with AOA positioning capability needs an antenna array. The base station using space diversity technique is widely used because it is simpler and able to reduce the fading effect effectively. Thus, great efforts in modifying the existing wireless system makes the AOA mobile positioning system difficult to realize in practice. In addition, the cost is much higher if antenna-array base stations are used.

There is also a to-be-solved issue, multipath. Multipath is the propagation phenomenon that results in radio signals' reaching the receiving antenna by two or more paths. Causes of multipath include atmospheric ducting, ionospheric reflection and refraction, and reflection from terrestrial objects. The terrestrial objects can be mountains and buildings, for example. The effects of multipath include constructive and destructive interference, and phase shifting of the signal. Therefore, the angle-of-arrival is mistakenly determined. Conventionally, the effects of multipath can be effectively eliminated by spread spectrum (SS). In spread spectrum communication system, such as CDMA (Code Division Multiplexing Access) system, a mobile station requests a one and only one pseudo-random code (PN), called spreading code, from a base station for transmitting data. Each mobile station spreads the data according to a unique spreading code to generate a spread signal for transmission. Also, the base station despreads the received spread signal from the mobile station according to the correspondent spreading code. The transmitted spread signal in the spread spectrum communication is the multiplication of the spreading code with the data. The spectrum of the spread signal is wider than that of the data because the spectrum of the spreading code is wider than that of the data. The noises attached to the spread signal can be effectively eliminated while despreading. For example, the spread code is the multiplication of each data bit with a sequence of 256 code bits, called chips. While despreading, the received spread signal is also multiplied by the same sequence of 256 code bits, and the noise is also reduced to $1/256$ at best. However, the multipath still effects the determination of the angle-of-arrival even though the noise has been reduced by the spread spectrum.

The disadvantages of the conventional positioning approach is as following:

1. The base stations require antenna array in the AOA method, which is expensive and complicated compared to the popular base stations using space diversity technique.
2. The effects of multipath reduce the accuracy of the angle-of-arrival.

SUMMARY OF THE INVENTION

It is therefore an object of the invention to provide an improved apparatus and method for estimating the angle-of-arrival with suppressing the multipath effects.

The invention achieves the above-identified objects by providing a new apparatus for estimating the angle-of-arrival in a spread spectrum communication system. Each base station includes a first antenna and a second antenna, the first antenna and the second antenna outputs the first spread-spectrum signal and the second spread-spectrum signal respectively. The apparatus comprises a de-spreading unit, a multipath suppressor, an AOA estimator. The de-spreading unit receives and de-spreads the first and the second spread signals, and outputs the first despread signal and the second despread signal. The multipath suppressor receives the first despread signal and the second despread signal, suppresses the multipath effects of the first and the second despread signals and accordingly outputs the first de-noise signal and the second de-noise signal. The AOA estimator receives the first and the second de-noise signals and outputs the angle-of-arrival accordingly.

It is another object of the invention to provide a method for multipath suppressing. First, receive a despread signal. Then, extract a set of transmitted pilot bits from the despread signal. And, multiply the set of transmitted pilot bits by a set of predetermined pilot bits and output a multiplication result.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
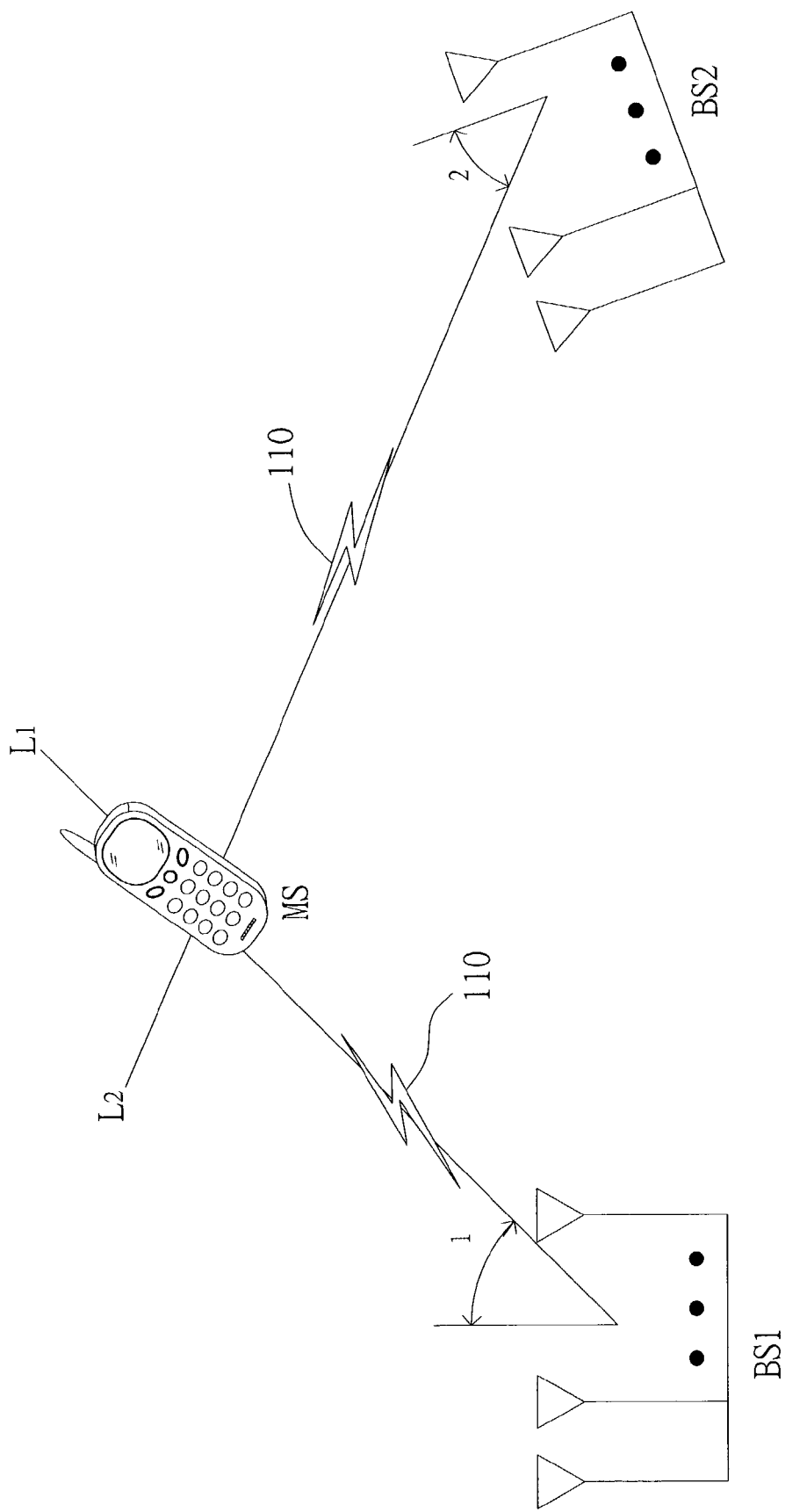
FIG. 1 is a diagram showing a mobile positioning system by using AOA.

The space diversity technique is widely adopted in the base stations of wireless communications systems. Because the space diversity technique can reduce the base station construction cost with a simpler architecture, and it also can effectively mitigate the fading effect of the incoming radio signal 110. A base station adopting the space diversity technique generally should include two or three antennas. Each of these two or three antennas receives a radio signal and then generates a branch output. To achieve reliable communication quality, the antennas of one base station are positioned away from each other for at least half of the wavelength of the radio signal; so that the amplitudes of the branch outputs of these antennas are statistically uncorrelated. That is, the expectation of the amplitudes of these branch outputs equals to zero, as known by persons who are skill in this art. Although the amplitudes of these branch outputs are statistically uncorrelated, the phase difference among these branch outputs are dependent on the respective incident angles of the radio signal 110 toward the corresponding antennas positioned at different locations. Since the base station knows the precise locations of its antennas, the specific incident angle 0 of the radio signal 110 can be accurately calculated through the phase difference among the branch outputs. The invention estimates the angle-of-arrival by the above-mentioned principle and further suppresses the effects of multipath by the spread spectrum technique.

In spread spectrum communication, such as W-CDMA (Wideband-CDMA) of the 3rd generation communication system, the spread signal is transmitted at each frame, each frame has 15 slots, and each slot has a set of pilot bits whose bit length is from 3 to 8 bits. The pilot bits are determined by both the base station and the mobile station while the connection is established, and the "predetermined pilot bits" are denoted as A. The received spread signal may be interfered by effects of multipath, and thus the "received pilot bits", denoted as A', may be different from the predetermined pilot bits A. For example, assume the three digits of the predetermined pilot bits, A=(A(0), A(1), A(2))=(1, −1, 1). The received spread signal is the superimposition of the signal D, from the direct path, and the signal D', from the multipath. Assuming the pilot bits AD of the direct path signal D has the same value as the predetermined pilot bits A, and thus AD=(AD(0), AD(1), AD(2))=A=(A(0), A(1), A(2))=(1, −1, 1). The phase of the signal D' is different from the signal D since the transmission path is different. Assume the pilot bits AD' of the multipath signal D' is (AD'(0), AD'(1), AD'(2))=(−1, 1, 1). The multiplication of the predetermined pilot bits with the received pilot bits is $$A * A' = (A(0)*A'(0), A(1)*A'(1), A(2)*A'(2))$$
$$= (A(0)*AD(0) + A(1)*AD(1) + A(2)*AD(2)) +$$
$$(A(0)*AD'(0) + A(1)*AD'(1) + A(2)*AD'(2))$$

The product of the multiplication of the predetermined pilot bits A with the direct path pilot bits AD is 3, while the product of the multiplication of the predetermined pilot bits A with the multipath pilot bits AD' is 1. The multiplication result from multipath signal is much less than that of the direct path signal, and thus the effects of multipath signal are effectively suppressed.

Figure 2:
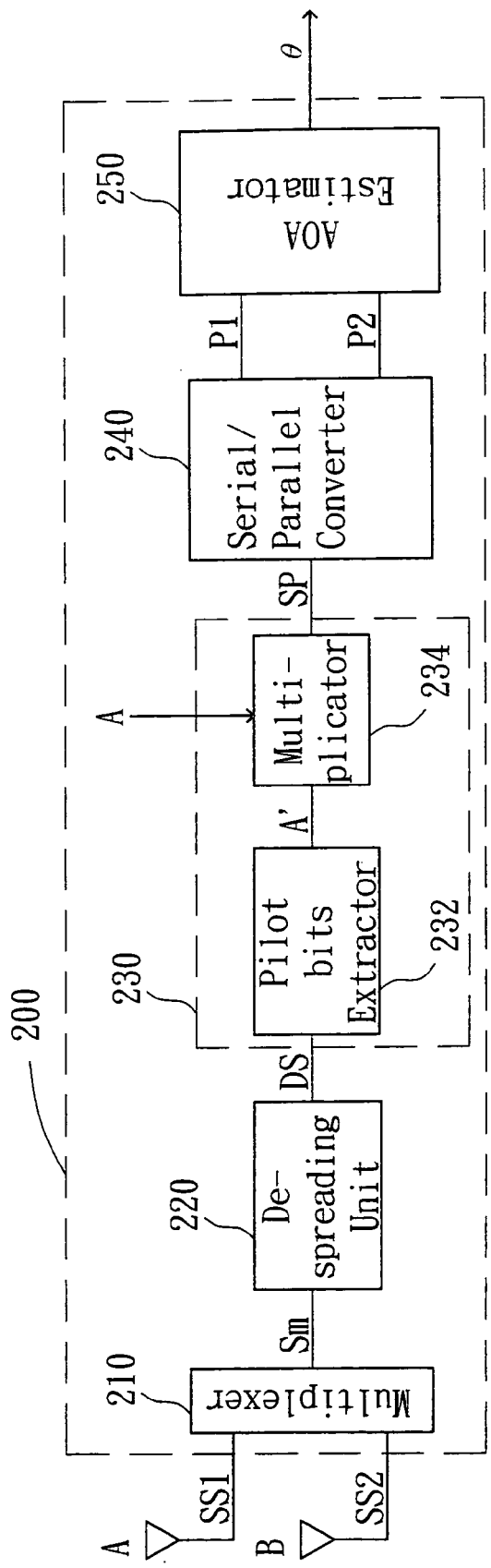
FIG. 2 is a block diagram of the apparatus for estimating the angle-of-arrival according to a preferred embodiment of this invention.

According to the above-mentioned principle, an apparatus for estimating the angle-of-arrival with the multipath suppressor is proposed in this invention. FIG. 2 is a block diagram of the apparatus for estimating the angle-of-arrival 200 according to a preferred embodiment of this invention. The apparatus 200 is used in a base station, which includes an antenna A and an antenna B. The antenna A receives the first radio signal and accordingly outputs a first spread signal SS1; and the antenna B receives the second radio signal and accordingly outputs a second spread signal SS2. The apparatus for estimating the angle-of-arrival 200 is coupled to the antennas A and B, receives both spread signals SS1 and SS2, and outputs the angle-of-arrival 0. The apparatus for estimating the angle-of-arrival 200 comprises the multiplexer 210, the de-spreading unit 220, the multipath suppressor 230, the serial/parallel converter 240, and the angle-of-arrival (AOA) estimator 250. The multiplexer 210 is coupled to the antennas A and B for receiving the spread signals SS1 and SS2 and outputting a multiplexed signal Sm. The multiplexer 210 selects the spread signal SS1 as output at the even time slot, and selects the spread signal SS2 as output at the odd time slot. Therefore, the time slot (0) of the multiplexed signal Sm comprises the data originally received in the spread signal SS1 time slot (0); the time slot (1) of the multiplexed signal Sm comprises the data originally received in the spread signal SS2 time slot (1); and the time slot (2) of the multiplexed signal Sm comprises the data originally received in the spread signal SS1 time slot (2), and so on.

The de-spreading unit 220 is coupled to the multiplexer 210 for receiving and de-spreading the multiplexed signal Sm and outputting a despread signal DS. The multipath suppressor 230 is coupled to the de-spreading unit 220 for receiving the despread signal DS, suppressing the multipath effects of the despread signal DS according to the above-mentioned principle and accordingly outputting a serial signal SP. The serial/parallel converter 240 is coupled to the multipath suppressor 230 for receiving the serial signal SP and outputting parallel signals P1 and P2 accordingly. The parallel signal P1 at the ith time slot, denoted as P1(i), is the result of de-spreading and multipath suppressing the spread signal SS1 at the (2*i)th time slot; and the parallel signal P2 at the ith time slot, denoted as P2(i), is the result of de-spreading and multipath suppressing the spread signal SS2 at the (2*i+1)th time slots, wherein i is zero or a positive integer. The AOA estimator 250 is coupled to the serial/parallel converter 240 for receiving parallel signals P1 and P2, and outputting the angle-of-arrival θ according to the phase difference of parallel signals P1 and P2.

The multipath suppressor 230 comprises a pilot bit extractor 232 and a multiplicator 234. The multipath suppressor 230 multiplies each bit of the predetermined pilot bits A, with each correspondent bit of the transmitted pilot bits A', and outputs the sum of the multiplication results. The pilot bits extractor 232 is coupled to the de-spreading unit 220 for receiving the despread signal DS and outputting the transmitted pilot bits A'. The multiplicator 234 is coupled to the pilot bits extractor 232 for receiving the transmitted pilot bits A'. The transmitted pilot bits A' then multiply with the predetermined pilot bits A and accordingly generate the serial signal SP. The multiplicator 234 processes the transmitted and the predetermined pilot bits A' at one time slot in this embodiment. If pilot bits at multiple time slots are processed, the result of suppressing the effects of multipath can be better.

The process for suppressing the effects of multipath by the multipath suppressor 230 is further explained below. First, receive the despread signal. Then, extract the transmitted pilot bits A' from the despread signal. Then, output the product of the multiplication of the transmitted pilot bits A' with the predetermined pilot bits A. The transmitted pilot bits A' and the predetermined pilot bits A should have the same number of bits (N digits). The process of multiplication of the predetermined pilot bits A with the transmitted pilot bits A' is further explained below: (a) Initially, both the variable P and variable J are reset as zero. (b) Multiply the jth bit of the transmitted pilot bits A' by the jth bit of the predetermined pilot bits A, and add the product of multiplication to the variable P. (c) Then, increase J by 1. (d) If J is less than N, then return to the first step (a), if J is equal to N, the variable P is the sum of the multiplication result.

Figure 3:
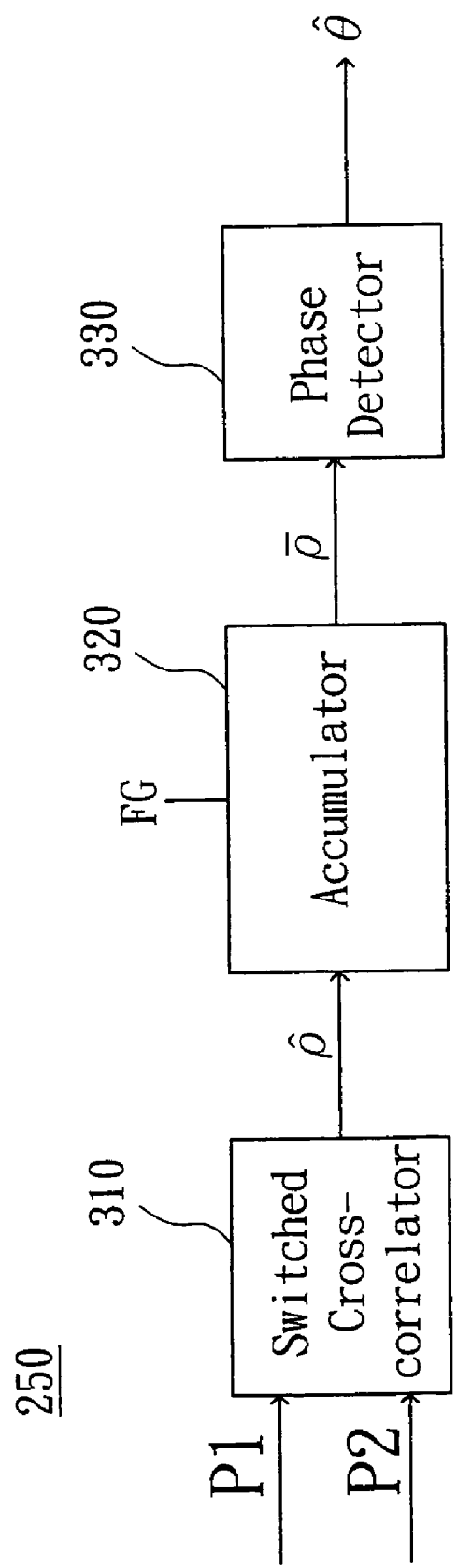
FIG. 3 is a block diagram of the AOA estimator.

FIG. 3 is a block diagram of the AOA estimator 250. The AOA estimator 250 includes a switched cross-correlator 310, an accumulator 320, and a phase detector 330. The switched cross-correlator 310 is coupled to the serial/parallel converter 240 for receiving and cross-correlating parallel signals P1 and P2 to output the cross-estimated correlation coefficients $\hat{\rho}$. The accumulator 320 is coupled to the switched cross-correlator 310 for receiving the cross-correlation coefficients $\hat{\rho}$ serially, giving each cross-correlation coefficients $\hat{\rho}$ a weight, and accordingly outputting a weighted average cross-correlation coefficient $\bar{\rho}$. The environmental factor, such as the speed of the mobile station, affects the quality of the received signal, because it require a longer time (about 10 ms) to receive a sample of the signal in the spread spectrum communication. The samples received should be weighted and summed to reduce the effects due to the variation of the environment, and to smooth the time varying characteristics of the channel. The weight of each cross-correlation coefficient $\hat{\rho}$ is adjusted by the forgetting factor (FG) whose value is smaller than 1. For example, if the accumulator adds the cross-correlation coefficients $\hat{\rho}$ (0), $\hat{\rho}$ (1), and $\hat{\rho}$ (2), and the $\hat{\rho}$ (0) is the earlier data and $\hat{\rho}$ (2) is the latest data. The weights factors of $\hat{\rho}$ (0), $\hat{\rho}$ (1), and $\hat{\rho}$ (2) are $(FG)^2$, (FG), and 1, respectively. The weight is larger if the data is received more recently to assure the accuracy of the angle-of-arrival. The phase detector 330 is coupled to the accumulator for receiving the weighted average cross-correlation coefficient $\bar{\rho}$ and accordingly outputting the angle-of-arrival.

Both the multiplexer 210 and the serial/parallel converter 240 basically are optional elements for reducing the necessary elements in the embodiment and thus reducing the implementation cost. If the multiplexer 210 and the serial/parallel converter 240 were removed, then (a) the de-spreading unit 220 should have two sets of identical circuits for de-spreading, and (b) the multipath suppressor 230 should have two sets of suppressing circuits. After above modification, the apparatus of current invention for estimating the angle-of-arrival includes a de-spreading unit, a multipath suppressor, and an AOA estimator. The de-spreading unit receives and de-spreads the first and the second spread-spectrum signals, and outputs the first despread signal and the second despread signal. The multipath suppressor is coupled to the de-spreading unit for receiving the first despread signal and the second despread signal, suppressing the multipath effects of the first and the second despread signals and accordingly outputting a first de-noise signal and a second de-noise signal. The AOA estimator is coupled to the multipath suppressor for receiving the first and the second de-noise signals and outputting the angle-of-arrival accordingly. The multipath suppressor includes a pilot bits extractor and a multiplication unit. The pilot bits extractor is coupled to the de-spreading unit for receiving the first despread signal and the second despread signal, and outputting the first pilot bits and the second pilot bits. The multiplication unit is coupled to the pilot bits extractor for receiving the first pilot bits and the second pilot bits, multiplying the first pilot bits and the second pilot bits with the predetermined pilot bits respectively, and accordingly outputs the first de-noise signal and the second de-noise signal.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for estimating an angle-of-arrival, the angle-of-arrival being an incident angle of a radio signal from a mobile station with respect to a base station in a spread spectrum communication system, the base station including a first antenna and a second antenna, the first antenna and the second antenna outputting a first spread signal and a second spread signal, respectively, according to the radio signal, the apparatus comprising:

a multiplexer coupled to the first and the second antennas for receiving the first spread signal and the second spread signal and outputting a multiplexed signal;

a de-spreading unit coupled to the multiplexer for receiving and de-spreading the multiplexed signal and outputting a despread signal;

a multipath suppressor comprising:
 a pilot bits extractor coupled to the de-spreading unit for receiving the despread signal and outputting a set of transmitted pilot bits; and
 a multiplicator coupled to the pilot bits extractor for receiving the set of transmitted pilot bits, multiplying the set of transmitted pilot bit by a set of predetermined pilot bits, and accordingly outputting a serial signal;

a serial/parallel converter coupled to the multipath suppressor for receiving the serial signal and outputting a first parallel signal of the first spread signal and a second parallel signal of the second spread signal accordingly; and an AOA estimator for cross-correlating the first and the second parallel signals and outputting the angle-of-arrival accordingly.

2. The apparatus according to claim 1, wherein the multiplexer selects the first spread signal for outputting as the multiplexed signal at even time slots, and selects the second spread signal for outputting as the multiplexed signal at odd time slots.

3. The apparatus according to claim 2, wherein the serial/parallel converter converts the serial signal at even time slots as the first parallel signal and converts the serial signal at odd time slots as the second parallel signal.

4. The apparatus according to claim 1, wherein the AOA estimator comprises:

a switched cross-correlator for receiving the first parallel signal and the second parallel signal, cross-correlating the first and the second parallel signals, and outputting a plurality of cross-correlation coefficients serially;

an accumulator coupled to the switched cross-correlator for receiving the cross-correlation coefficients serially, giving each cross-correlation coefficient a weight, and accordingly outputting a weighted average cross-correlation coefficient; and a phase detector coupled to the accumulator for receiving the weighted average cross-correlation coefficient and accordingly outputting the angle-of-arrival.

5. The apparatus according to claim 4, wherein the weight is larger if the corresponding cross-correlation coefficient is received more recently.

6. An apparatus for estimating an angle-of-arrival, the angle-of arrival being an incident angle of a radio signal from a mobile station with respect to a base station in a spread spectrum communication system, the base station including a first antenna and a second antenna, the first antenna and the second antenna outputting a first spread-spectrum signal and a second spread-spectrum signal, respectively, according to the radio signal, the apparatus comprising:

a de-spreading unit for receiving and de-spreading a first slot signal of the first spread signal and a second slot signal of the second spread signal, and outputting a the first slot signal and the second slot signal;

a multipath suppressor comprising:
    a pilot bits extractor coupled to the de-spreading unit for receiving the first slot signal and the second slot signal, and extracting a first set of pilot bits from the first slot signal and a second set of pilot bits from the second slot signal; and
    a multiplication unit for receiving the first set of pilot bits and the second set of pilot bits, multiplying the first set of pilot bits and the second set of pilot bits by a set of predetermined pilot bits respectively, and accordingly outputting a first de-noise signal and a second de-noise signal; and an AOA estimator for receiving the first and the second de-noise signals and outputting the angle-of-arrival accordingly.

7. The apparatus according to claim 6, the AOA estimator further comprising:

a switched cross-correlator for receiving the first and the second de-noise signals, cross-correlating the first and the second de-noise signals, and outputting a plurality of cross-correlation coefficients serially;

an accumulator coupled to the switched cross-correlator for receiving the cross-correlation coefficients serially, giving each cross-correlation coefficients a weight, and accordingly outputting an average cross-correlation coefficient; and a phase detector coupled to the accumulator for receiving the average cross-correlation coefficient and accordingly outputting the angle-of-arrival.

8. An apparatus for estimating an angle-of-arrival, the angle-of-arrival being a incident angle of a radio signal from a mobile station with respect to a base station in a spread spectrum communication system, the base station including a first antenna and a second antenna, the first antenna and the second antenna outputting a first spread signal and a second spread signal respectively according to the radio signal, the apparatus comprising:

a multiplexer coupled to the first and the second antennas for receiving the first spread signal and the second spread signal and outputting a multiplexed signal;

a de-spreading unit coupled to the multiplexer for receiving and de-spreading the multiplexed signal and outputting a despread signal;

a multipath suppressor comprising:
    a pilot bits extractor coupled to the de-spreading unit for receiving the despread signal and outputting a set of transmitted pilot bits; and
    a multiplicator coupled to the pilot bits extractor for receiving the set of transmitted pilot bits, multiplying the set of transmitted pilot bit by a set of predetermined pilot bits, and accordingly outputting a serial signal;

a serial/parallel converter coupled to the multipath suppressor for receiving the serial signal and outputting a first parallel signal of the first spread signal and a second parallel signal of the second spread signal accordingly; and an AOA estimator for cross-correlating the first and the second parallel signals and outputting the angle-of-arrival accordingly, wherein the AOA estimator comprises:
    a switched cross-correlator for receiving the first parallel signal and the second parallel signal, cross-correlating the first and the second parallel signals, and outputting a plurality of cross-correlation coefficients serially;
    an accumulator coupled to the switched cross-correlator for receiving the cross-correlation coefficients serially, giving each cross-correlation coefficients a weight, and accordingly outputting an average cross-correlation coefficient; and
    a phase detector coupled to the accumulator for receiving the average cross-correlation coefficient and accordingly outputting the angle-of-arrival.

* * * * *